United States Patent [19]

Naitoh

[11] 4,295,684

[45] Oct. 20, 1981

[54] SAFETY BELT WIND-UP DEVICE

[75] Inventor: Katsumi Naitoh, Fujisawa, Japan

[73] Assignees: NSK-Warner K.K., Tokyo; Nissan Motor Co., Ltd., Yokohama, both of Japan

[21] Appl. No.: 94,200

[22] Filed: Nov. 14, 1979

[30] Foreign Application Priority Data

Jan. 19, 1979 [JP] Japan ................................. 54-3874

[51] Int. Cl.³ ...................... A62B 35/00; B65H 75/48
[52] U.S. Cl. .................................. 297/475; 242/107.6; 297/476
[58] Field of Search.. 242/107.6, 107.7, 107.4 R–107.4 E; 280/801, 806–808; 297/475–478, 483; 180/268–270

[56] References Cited

U.S. PATENT DOCUMENTS 4,198,011 4/1980 Kamijo et al. .................. 280/807 X
4,199,172 4/1980 Fukunaga et al. .................. 280/807

FOREIGN PATENT DOCUMENTS 2250282 5/1975 France ........................ 242/107.4 R

*Primary Examiner*—John M. Jillions
*Attorney, Agent, or Firm*—Silverman, Cass & Singer, Ltd.

[57] ABSTRACT

A safety belt wind-up device includes a rotatable belt wind-up shaft, wind-up force lock device capable of assuming interlocked and uninterlocked positions with the wind-up shaft including a first member rotatively driven by the wind-up shaft when the wind-up force lock device is in the interlocked position, a first cam rotating together with the first member, a second member rotatively driven by the first member engaging the second member, and a second cam rotating together with the second member, and a device for bringing the lock device into the interlocked and uninterlocked positions depending upon engagement and disengagement of a buckle of the device. The device permits a safety belt to be drawn out of the device to a length required for a user's action from the equipped position and completely delete the wind-up force acting upon the belt at the equipped position, whereby the user is not subjected to a belt wind-up force.

8 Claims, 12 Drawing Figures

FIG_8

SAFETY BELT WIND-UP DEVICE

BACKGROUND OF THE INVENTION

1. Field of the Invention

This invention relates to a safety belt wind-up device for automatically winding up a safety belt or band for vehicles such as automobiles, and more particularly to a safety belt wind-up device including means for locking a wind-up force or tensile force.

Various kinds of wind-up devices have been suggested. One of the most common devices comprises a coil spring for producing a wind-up force of a wind-up shaft. With this device, the longer or further the belt is drawn out of the device, the greater the belt wind-up force becomes as a result of the coil spring being squeezed. The increased wind-up force is therefore transmitted through the belt to a user, equipped with the belt of the device of this type, who is directly subjected to the wind-up force.

Another device hitherto suggested comprises means for controlling the wind-up force of a coil spring depending upon the length of a drawn belt to overcome the above disadvantage. However, the wind-up force acting upon the belt in such an equipped condition is not deleted but only mitigated, so that a user is subjected to a compressive force which is uncomfortable for him. Moreover, as the wind-up force is controlled depending upon the length of the drawn belt, the wind-up force acting upon the belt varies with the length of the drawn belt, so that users are subjected to compressive forces different according to their physique.

Further wind-up devices hitherto suggested comprise wind-up force lock means to avoid a compressive force acting upon a user equipped with a safety belt of the device. Some of the devices do not allow users equipped with the belts to move to determined extents and when they returned to the original seat position the devices lock the wind-up force in the extended condition without winding up the belts. Other devices allow users to move only within very short distances (for example, corresponding to one revolution of a reel), even if the devices comprise wind-up force lock means for locking original wind-up forces. Therefore, if the users move beyond the short distances, the positions of the equipped belts are shifted when they return to the original seat positions so that the loosened belts are locked, which would not perform their function as safety belts. In order to avoid this disadvantage, an over drawn belt cancelling switch is provided on a buckle to detect the originally equipped position of the belt and thereafter the wind-up force is locked. Such an operation is very troublesome. Furthermore, with other devices after wind-up forces have been locked if the belts are intentionally drawn and released, the belts are returned to locked positions by main springs, at which moments the lock means are apt to be damaged. In addition, with other devices solenoids used in wind-up force lock means are not sufficiently protected, so that dust and salt water enter the devices to cause electrical troubles of the solenoids resulting in malfunctions.

SUMMARY OF THE INVENTION

It is an object of the present invention to provide an improved safety belt wind-up device with wind-up force lock means which overcome the disadvantages of the prior art.

It is another object of the present invention to provide a safety belt wind-up device comprising wind-up force lock means which permit a belt to be drawn out of the device to a length required for a user's action from the equipped position and completely delete the wind-up force acting upon the belt at the equipped position.

The invention will be more fully understood by referring to the following detailed specification and claims taken in connection with the appended drawings.

DETAILED DESCRIPTION OF THE PREFERRED EMBODIMENT

Figure 1:
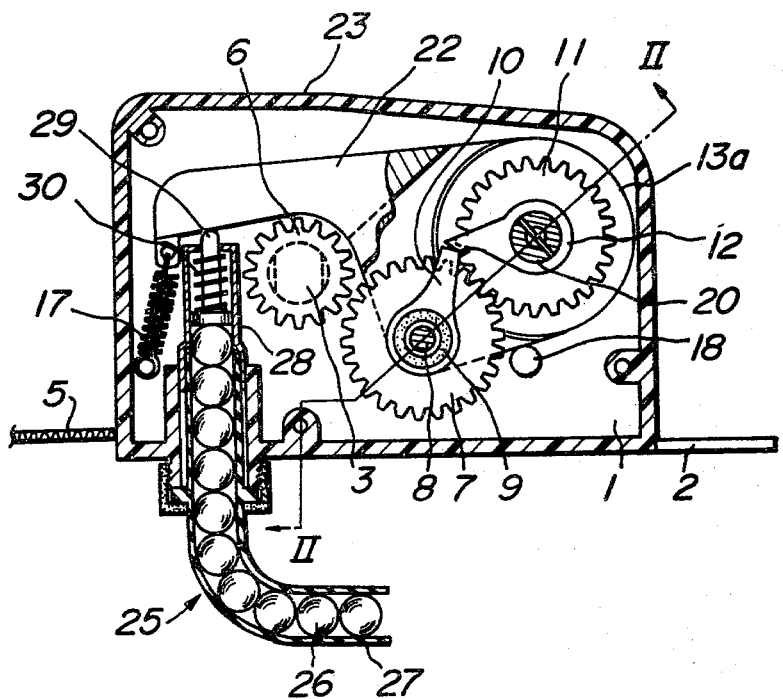
FIG. 1 is a sectional front elevation of the device of one embodiment of the invention.
Figure 2:
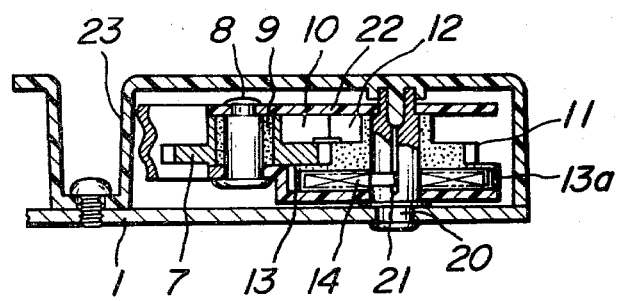
FIG. 2 is a sectional view taken along the line II—II of the device shown in FIG. 1.

Referring to FIGS. 1 and 2 illustrating one embodiment of the invention, a safety band or belt wind-up device comprises one side plate 1 of a frame and the other side plate 1 opposite thereto, between which a base plate 2 extends. A wind-up shaft 3 is rotatably supported by the two side plates 1 and is rotatively driven in a webbing wind-up direction which is a counterclockwise direction as viewed in FIG. 1 by means of a wind-up spring mounted on the opposite side plate 1. In a condition shown in FIG. 1, a webbing or belt 5 extends from a location radially remote or a relatively long distance from the shaft 3 because the length of the webbing 5 has been wound about the shaft 3.

The wind-up shaft 3 is provided at its end with a gear 6 rotatable in unison with the shaft 3. An idle gear 7 adapted to be brought into engaged and disengaged positions with the gear 6 is rotatably mounted through a collar 9 on a shaft 8 fixed to a shifter 22 rockable about a shaft 20 fixed to the side plates 1 clearly shown in FIG. 2 which is a sectional view taken along the line II—II of FIG. 1. A radially extending cam member 10 is fixed to the idle gear 7 and rotatable therewith about the shaft 8. On the shaft 20 is also mounted a stop gear 11 in mesh with the idle gear 7. A cam member 12 is fixed to the stop gear 11 and rotatable therewith about the shaft 20 in the same manner as the idle gear 7. The cam member 12 also radially extends to engage the cam member 10 at two positions, such that these cam members are restrained thereat as will be described later. The stop gear 11 is formed on the opposite side of the shifter 22 with a casing 13 for receiving therein a restoring spring 14. The restoring spring 14 has an inner end anchored in a slit 21 of the shaft 20 and an outer end fixed to the inside 13a of the casing 13 and rotatively drives the stop gear 11 in a counterclockwise direction as viewed in FIG. 1, so that upon disengaging the idle gear 7 and gear 6, the idle gear 7 and stop gear 11 are returned to and stopped at a first restraint position as shown in FIG. 1, where the cam members 10 and 12 are engaged and restrained with each other. The wind-up force lock means according to the invention is formed in this manner.

The portion of the shifter 22 through which the shafts 8 and 20 pass is in the form of two plates within which space the gears 7 and 11 and the like are received. The shifter 22 includes one plate-like portion extending to the left as viewed in FIG. 1, to which is secured one end of a shifter restoring spring 17 having the other end anchored to a protrusion provided on the side plate 1. In this manner, the shifter 22 is driven in a counterclockwise direction as viewed in FIG. 1 and the counterclockwise rotation of the shifter 22 is limited by a stopper 18 extending from the side plate 1.

The device further comprises a mechanism 25 for rocking or swinging the shifter 22 in response to the engagement or disengagement of a buckle of a safety belt to bring the gear 6 and idle gear 7 into engagement or disengagement with each other. The mechanism 25 includes a flexible tube 27 extending through an opening of a cover 23 for covering the components of the device and accommodating therein steel balls 26 closely arranged in a row along a longitudinal axis of the flexible tube 27. Onto the inner end of the flexible tube 27 is fitted a cap 28 with which is arranged a rod 29 urged or pressed downwardly as viewed in FIG. 1 against the uppermost steel ball 26 by a rod restoring spring 30.

With this arrangement, the shifter 22 is rotated in a clockwise direction about the shaft 20 by means of the rod 29 raised upwardly as viewed in FIG. 1 upon the engagement of the buckle, if the steel balls 26 are adapted to be urged upon the engagement of the buckle. In this manner the gear 6 and idle gear 7 are brought into engagement with each other.

Figure 5:
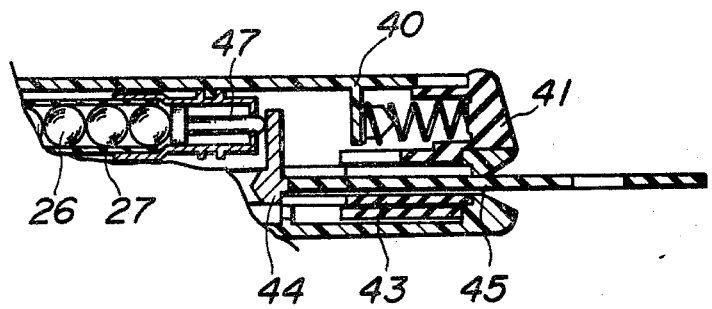
FIG. 5 is a sectional view of a buckle illustrating a mechanism of the buckle for moving a shifter of the device shown in FIG. 1 in response to buckle latching operation.

The steel balls may be pushed, for example, by manually pushing a button secured to the outer end of the tube 27 after the engagement of the buckle. It is, however, convenient to effect the pushing of the steel balls in an automatic response to the insertion of a tongue into the buckle. Such an example is shown in FIG. 5 which is a front elevation of a buckle and illustrates a cover 40, a push button 41 adapted to be urged in a tongue inserting direction, and a base member 43 supporting a latch member engaging the tongue 45. In this embodiment, a slider 44 for pushing out the tongue 45 upon disengagement is slidably urged by the inserted tongue 45 to push a rod 47. Accordingly, the rod 29 is maintained in its raised position under the buckle engaged condition. Upon disengaging the buckle, the slider 44 is slid to the right as viewed in FIG. 5 and the rod 29, steel balls 26 and rod 27 are returned to their original positions with the aid of the force of the rod restoring spring 30.

The operation of the embodiment constructed as above described will be explained hereinafter.

So long as the buckle of the safety belt device is not latched, the wind-up force lock means is in the condition shown in FIG. 1 and only the wind-up shaft 3 and gear 6 are rotated by drawing the webbing out of the device.

Figure 3:
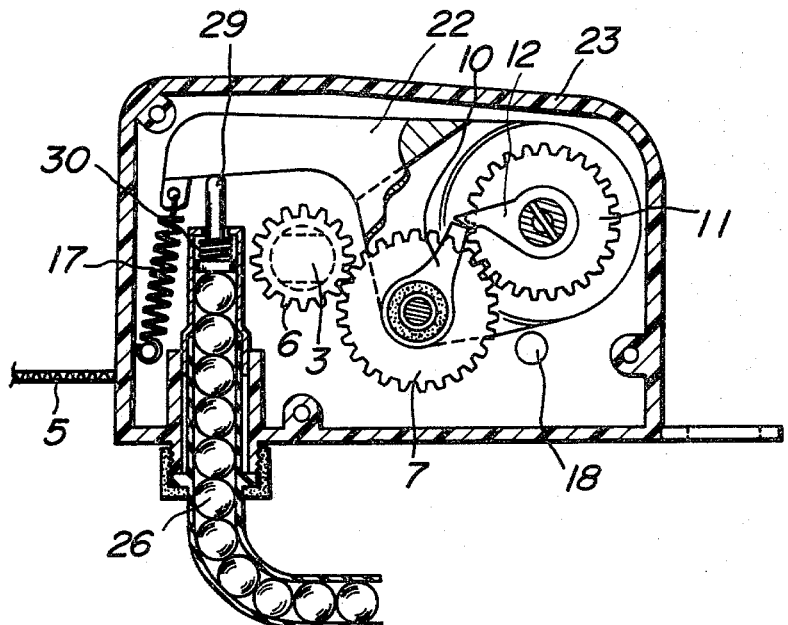
FIG. 3 is a sectional view for explaining the operation of the device shown in FIG. 1.

When the webbing is drawn to a suitable length, the buckle is latched, so that the rod 29 is pushed against the force of the rod restoring spring 30 as shown in FIG. 3, under which condition the gear 6 engages the idle gear 7. Accordingly, even if the wind-up spring drives the wind-up shaft 3 in the direction for winding up the webbing 5, it is not wound up because the gear 6 fixed to the wind-up shaft 3 is prevented from rotating in the direction for winding up the webbing 5 because the idle gear 7 in mesh with the gear 6 is prevented from rotating in the clockwise direction due to the restraint of the cam members 10 and 12. Therefore, a user is not subjected to the force of the webbing wind-up spring while he is equipped with the safety belt.

Figure 4:
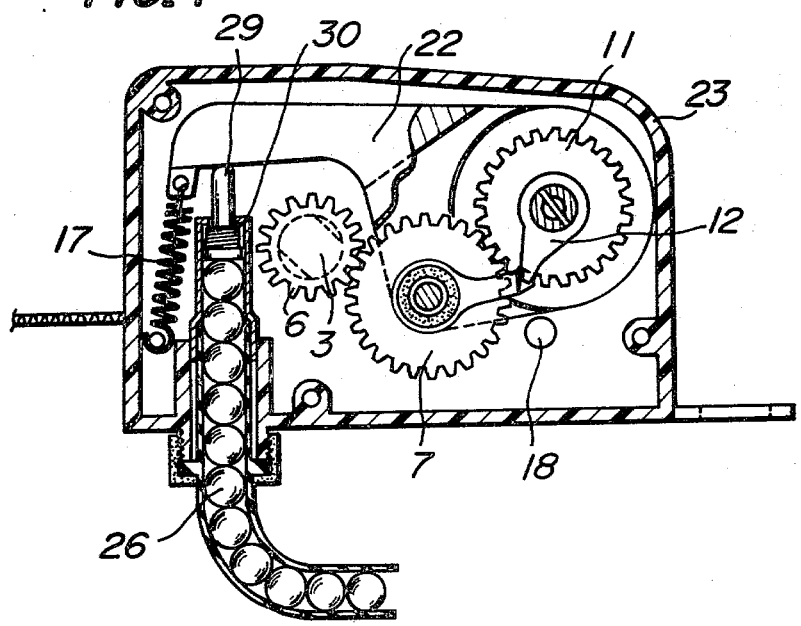
FIG. 4 is a sectional view for explaining the operation of the device in a position different from that of FIG. 3.

Under the condition shown in FIG. 3, however, it is possible to draw the webbing out of the device to a certain length, because the rotation of the gear 6 in the clockwise direction or the rotation of the idle gear 7 in the counterclockwise direction is not prevented by the cam members 10 and 12. The extent to which the webbing can be drawn is determined by the design of the device. With this embodiment, the gears 6, 7 and 11 have sixteen, twenty-six and twenty-five teeth, respectively, and therefore the rotating ratio of the gear 6 to the idle gear 7 is 26 to 16. On the other hand, now we take into account the number of rotations of the idle gear 7 which rotates from the position shown in FIG. 3 in the counterclockwise direction while the stop gear 11 rotates in the clockwise direction to a position where the cam members 10 and 12 are again engaged and restrained with each other. When the idle gear 7 has rotated one revolution from the position shown in FIG. 3 in the counterclockwise direction, the stop gear 11 has rotated 1 1/25 revolution in clockwise direction and the cam members 10 and 12 are shifted in phase under which condition they are not engaged with each other. In this manner, the shift in phase between the cam members increases until the idle gear 7 has rotated approximately 24 revolutions in the counterclockwise direction, and the cam members are engaged and restrained with each other in another position shown in FIG. 4 when the idle gear 7 has rotated 24 revolutions. Accordingly, it is permitted to draw the webbing while the gear 6 has rotated approximately 24×26/16=39 revolutions in clockwise direction as viewed in FIG. 3. This number of rotations of the gear 6 is somewhat too large for an allowable length of the drawn webbing. It should be however understood that the allowable length of the drawn webbing can be fairly freely determined by suitably selecting the number of teeth of the respective gears.

It is further understood that the various changes and modifications may be made in the invention without departing from the spirit and scope thereof. For example, the mechanism for driving the shifter 22 may be electrical means using a solenoid. Moreover, an idle gear may be mounted on a wind-up shaft rotatably relative thereto and brought into locked or unlocked relation to the wind-up shaft by sliding a clutch member on the wind-up shaft in its axial direction. Furthermore, the steel balls may be replaced with a push-pull wire or hydraulic or pneumatic means. In addition, when the shifter 22 is moved to bring the idle gear 7 and stop gear 11 into the locked relation to the wind-up shaft 3 upon latching the buckle, the movement of the steel balls in the above embodiment may be converted into a movement of means like a link mechanism to accumulate the movement of the steel balls and thereafter the link mechanism is returned to its original position to release the accumulated movement as by drawing the webbing to move the shifter 22, thereby preventing the webbing from being locked in loosened condition and therefore locking the webbing in tightly fitting manner with a person.

In brief, the device according to the invention is characterized in utilizing two gears having cam members which are brought into locked or unlocked relation to a wind-up shaft and various modifications of the other aspects may be made.

The device according to the invention does not exert the tensile force of the webbing on the user being equipped with the safety belt and is capable of drawing and winding up the webbing within a determined length from the equipped condition.

Figure 6:
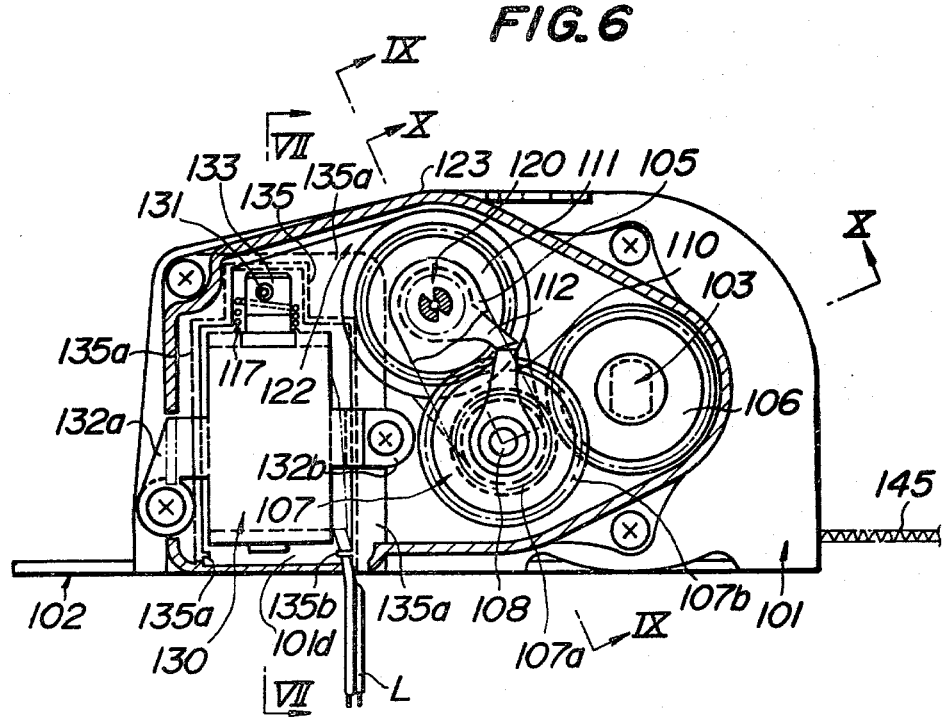
FIG. 6 is a sectional view of the device of another embodiment of the invention.

Referring to FIGS. 6-10 illustrating another embodiment of the invention, a wind-up device comprises one side plate 101 and the other side plate 101 opposite thereto, between which a base plate 102 extends and wind-up shaft 103 is rotatably supported and is rotatively driven in a clockwise direction as viewed in FIG. 6 by means of a wind-up spring provided on the side plate 101 on the opposite side of the side plate shown in the drawing.

Figure 10:
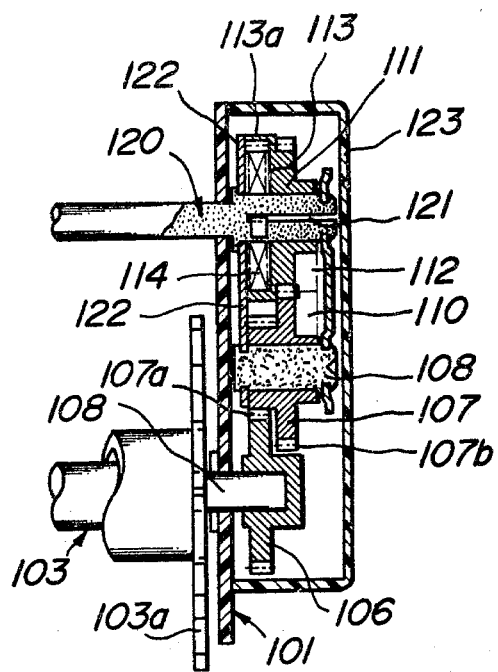
FIG. 10 is a sectional view taken along line X—X in FIG. 6.

The wind-up shaft 103 is provided on its one end with a main gear 106 adapted to rotate in unison together with the wind-up shaft 103. The shaft 103 comprises a latch plate 103a forming one part of an emergency lock mechanism for the wind-up device (FIG. 10). The emergency lock mechanism is for locking a seat belt in an emergency such as a collision, which is conventional. This mechanism will not be described in further detail since this is not essential for an understanding of the invention.

Figure 9:
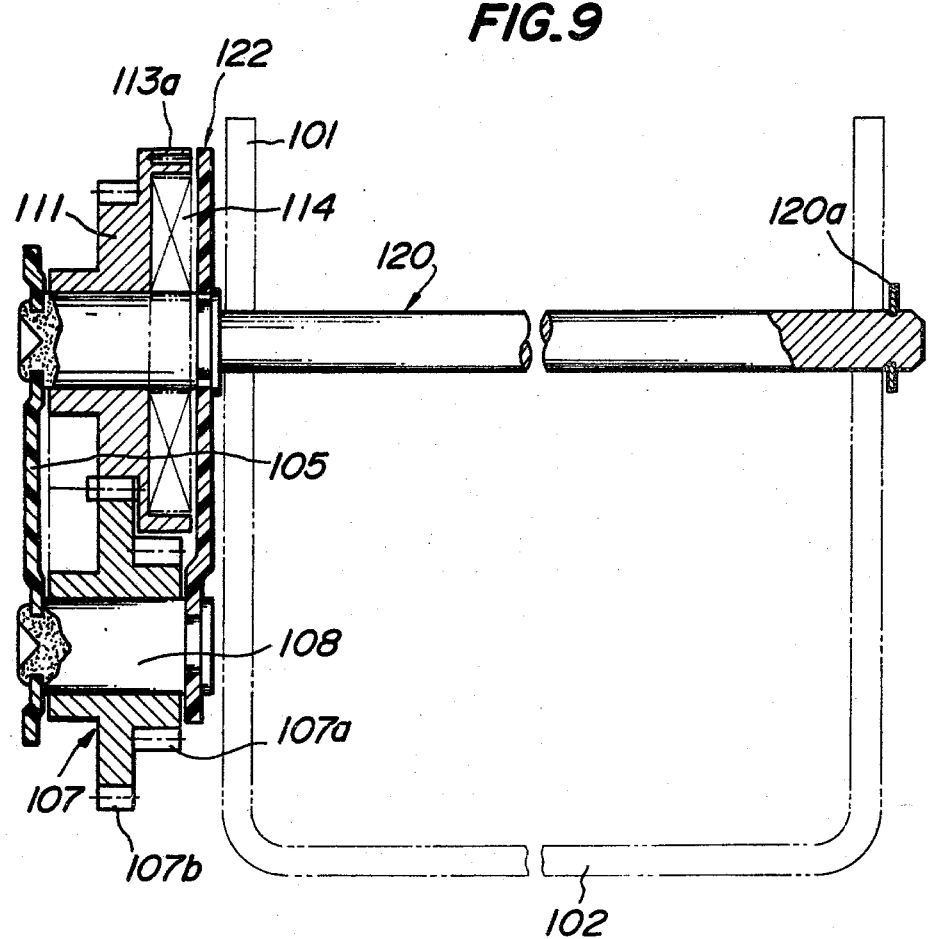
FIG. 9 is a sectional view taken along the line IX—IX of FIG. 6.

An idling gear 107 is movable between its engaged and disengaged positions with the main gear 106 and comprises a pinion gear 107a adapted to be in mesh with the main gear 106 and a bull gear wheel 107b normally in mesh with a stop gear 111 described later. The idling gear 107 is rotatably mounted on a shaft 108 fixed to a shifter 122 which is swingable together with a rotating shaft 120 provided extending between the two side plates 101. The rotating shaft 120 and shaft 108 are incorporated in the shifter 122 and thereafter preferably coated with a resin coating, thereby absorbing noise on the coated surfaces to obtain a silent operation and preventing a malfunction due to rust. In this case, the rotating shaft 102 and shaft 108 are fixed in position to a clamp plate 105 by caulking the ends of the shafts or by heating such as by high-frequency heating (FIG. 9). A circular clip or snap ring 120a is provided on the other end of the rotating shaft 120.

A radially extending cam 110 is mounted on the shaft 108 and rotatable thereabout together with the idling gear 107.

A stop gear 111 in mesh with the gear wheel 7 is rotatably mounted on the shaft 120 in unison with the shifter 22. In a manner similar to the idling gear 107, the stop gear 111 is integrally formed with a radially outwardly extending cam 112 rotating together with the stop gear 111. The cam 112 engages the cam 110 in two positions to restrain the rotations in determined directions with each other. In one position shown in FIG. 6, the idler gear 107 and stop gear 111 are prevented from rotating in counterclockwise and clockwise directions, respectively. In the other position which occurs when the cam members 110 and 112 assume positions substantially opposite to those shown in FIG. 6 with respect to a line connecting centers of the gears 107 and 111, the gears 107 and 111 are prevented from rotating in clockwise and counterclockwise directions.

The stop gear 111 is formed on the opposite side of the shifter 122 with a casing 113 for receiving therein a restoring spring 114 (FIG. 10). The restoring spring 114 has an inner end anchored in a slit 121 (FIG. 10) of the shaft 120 and an outer end fixed to a slit of the inside 113a of the casing 113 and rotatively drives the stop gear 111 in a clockwise direction as viewed in FIG. 6, so that upon disengaging the idle gear 107 and main gear 106, the idle gear 107 and stop gear 111 are returned to and stopped at a first restraint position as shown in FIG. 6 where the cam members 110 and 112 are engaged and restrained with each other.

A solenoid assembly 130 for operating the shifter 122 in response to the engagement and disengagement of the buckle of the sheet belt will be then explained.

Figure 7:
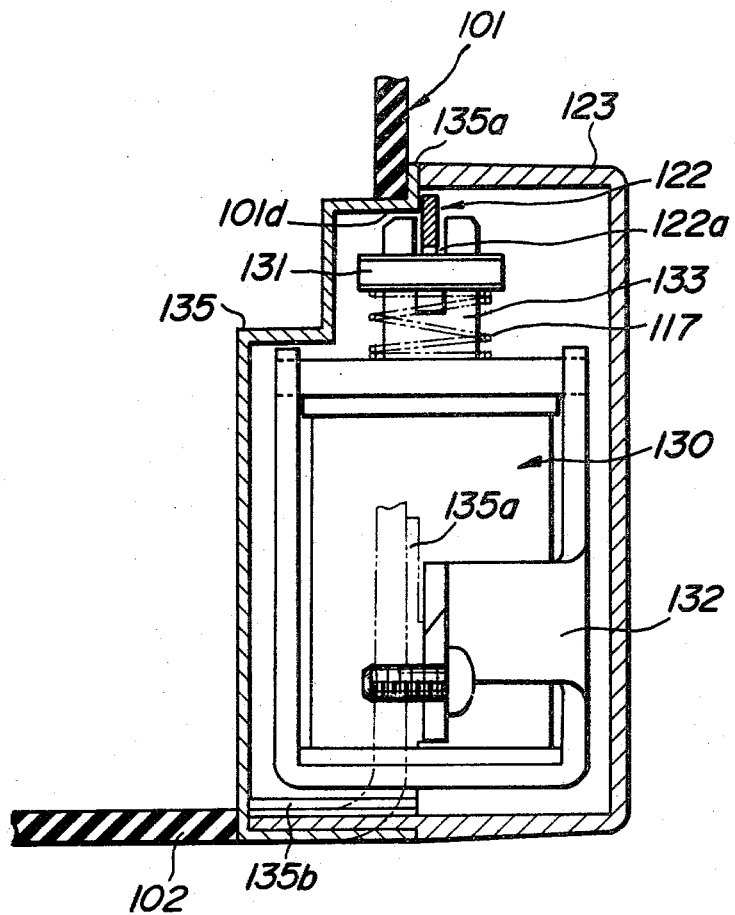
FIG. 7 is a sectional view taken along the line VII—VII in FIG. 6.
Figure 8:
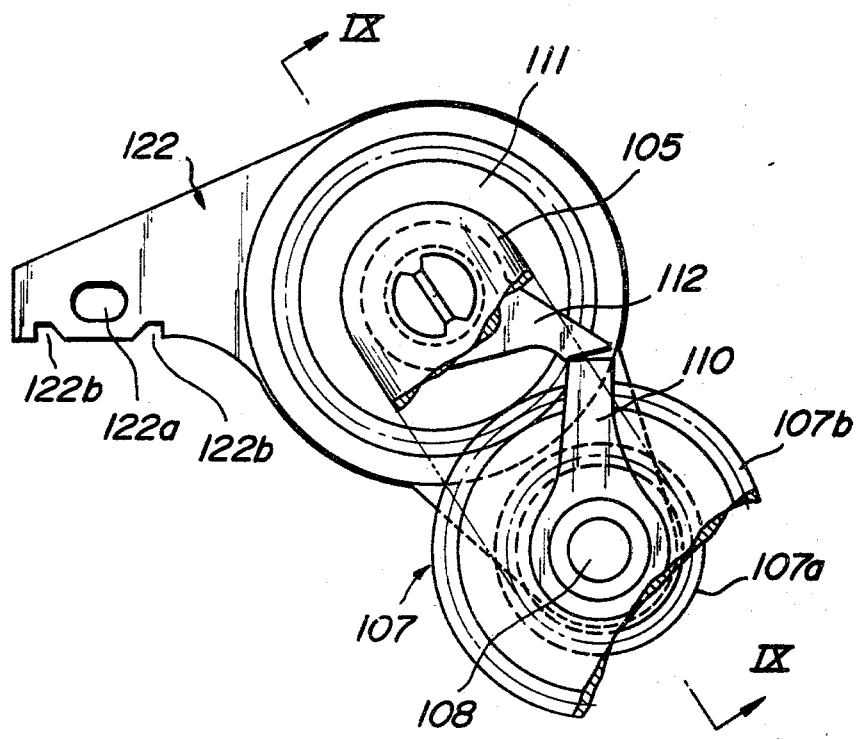
FIG. 8 is an enlarged fragmentary view of part of the device shown in FIG. 6.

The solenoid assembly 130 is fitted within a cavity 101d of the side plate and fixed thereto by means of a bracket 132 integrally forming one part of the solenoid assembly 130 and having lugs 132a and 132b extending from its sides bolted to the side plate 101. The bracket 132 serves as a beam to reinforce the cavity 101d of the side plate 101 which would otherwise weaken the side plate. An actuator 133 is connected to the shifter 122 by means of a press fitted pin 131 passing through an opening 122a (FIG. 8) of the shifter 122 and is urged by means of a coil spring 117 upwardly as viewed in FIG. 7. The upper end of the coil spring 117 is stably supported at four points on the pin 131 and two notches 122b of the shifter 122 (FIG. 8). When the solenoid assembly 130 is energized, the actuator 133 is pulled downwardly against the force of the spring 117 and the shifter 122 is rotated in the counterclockwise direction as viewed in FIG. 6. When the solenoid assembly is deenergized, the actuator 133 is returned upwardly with the aid of the force of the spring 117 and therefore the shifter 122 is rotated in the clockwise direction as viewed in FIG. 6 until its end becomes near an upper wall of a waterproof cover 135 (FIG. 7).

The mechanism above described between the side plates 101 is covered by a cover 123 fixed thereto and the solenoid assembly 130, within the cavity 101d of the side plate and exposed to the inside thereof is protected by the waterproof cover 135. In this manner, the mechanism between the side plates 101 is substantially completely closed from the outside by the covers 123 and 135 with the exception of the lugs 132a of the bracket 132 and an opening through which lead wires L pass. The waterproof cover 135 includes flange portions 135a except the lower portion as viewed in FIG. 7, which extend over the outer surface of the side plate 101 and are fixed together with the lugs 132a and 132b of the bracket 132 to the side plate 101 by means of common setscrews. The lower end of the cover 123 is inserted between a protrusion 135b and the lower portion of the waterproof cover 135 and jointed together at the shoulders of the covers. Between the lugs 132a and 132b of the bracket 132 and the side plate 101 are inserted the flange portions 135a of the waterproof cover 135 made of a plastic resin to form an electric insulator which prevents magnetic flux from leaking during the solenoid energized condition to obtain the effective attraction.

The operation of the device of this embodiment above described will be explained hereinafter.

Figure 11:
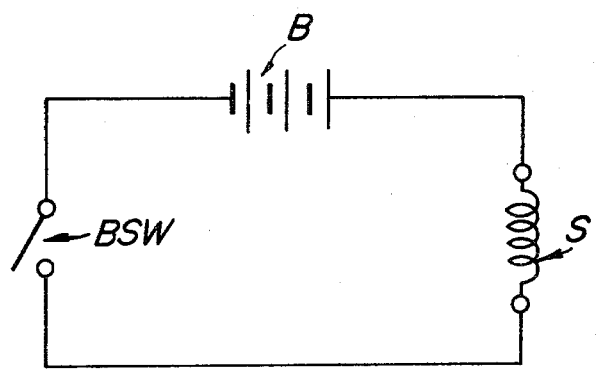
FIG. 11 illustrates an electric circuit including a solenoid for use in the device shown in FIG. 6.
Figure 12:
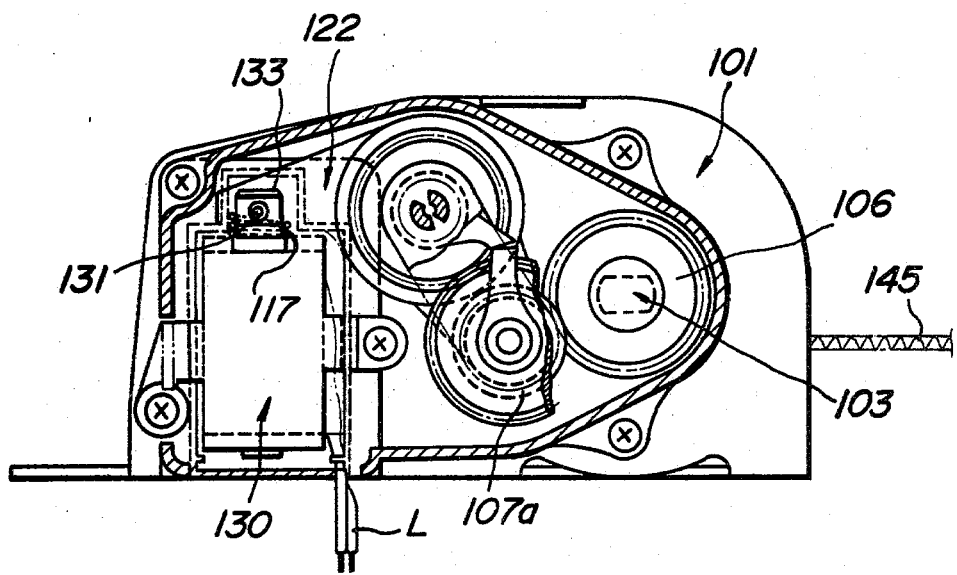
FIG. 12 is a sectional view of the device shown in FIG. 6 for explaining the operation thereof.

At first, a webbing 145 is drawn out of the device and a buckle is latched while the webbing is being tensioned against the force of the wind-up spring. At the moment a buckle switch BSW is closed to supply a current from a battery B to a solenoid S (FIG. 11). When the solenoid assembly 130 is energized in this manner, the shifter 122 is rotated in the counterclockwise direction as above described to bring the idle gear 107 and the main gear 103 into mesh with each other (FIG. 12). Under this condition shown in FIG. 12, the wind-up shaft 103 is prevented from rotating in the webbing wind-up direction because the idle gear 107 in mesh with the main gear 103 is prevented from rotating in the counterclockwise direction as viewed in FIG. 12 by the engagement of the cam members 110 and 112. Therefore, a user is not subjected to the force of the webbing wind-up spring while he is equipped with the safety belt. Under the condition shown in FIG. 12, however, it is possible to draw the webbing out of the device to a certain length, because the rotation of the main gear 106 in the counterclockwise direction or the rotation of the idle gear 107 in the clockwise direction is not prevented by the cam members 110 and 112. It is then possible to draw the webbing from a comfortable position to a certain length. The webbing must of course be drawn against the forces of the webbing wind-up spring and restoring springs 114 and 117 accommodated in the casing 113 of the stop gear 111.

The extent to which the webbing can be drawn is determined depending upon the gear ratios of the main gear 106, gears 107a and 107b of the idle gear 107 and stop gear 111, because the rotation of the main gear 106 in the counterclockwise direction is prevented by a second restraint of the cam members 110 and 112 which occurs after the main gear 106 has rotated a certain number of revolutions.

When the buckle is released, the buckle switch BSW is opened to deenergize the solenoid assembly 130 so that the shifter 122 is rotated in the clockwise direction by the force of the coil spring 117 so as to return to the condition shown in FIG. 6. The idle gear 107 and main gear 106 are disengaged from each other in this manner and therefore with the aid of the restoring spring 114 the idle gear 107, stop gear 111 and the cam members 110 and 112 are returned to and stationary at the condition shown in FIG. 6.

As can be seen from the description the device of this embodiment is insusceptible to dust, salt water or the like and comfortable to use.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A safety belt wind-up device including an engageable and disengageable buckle, comprising: a rotatable webbing wind-up shaft driven in a direction for winding up a webbing of the device, wind-up force lock means capable of assuming interlocked and uninterlocked positions with said wind-up shaft, said lock means in said interlocked position preventing a drawn webbing from being further wound up but providing for said webbing to be drawn and wound up within a predetermined length of said drawn webbing, and means for bringing said lock means into said interlocked and uninterlocked positions, respectively, depending upon engagement and disengagement of the buckle of said device, said wind-up force lock means comprising (1) a first member engaged with and being rotatively driven by said wind-up shaft while said wind-up force lock means are in said interlocked position, (2) a first cam rotating together with said first member, (3) a second member engaged with and being rotatively driven by said first member, and (4) a second cam rotating together with said second member, said first and second cams being substantially in a first engagement position when said wind-up force lock means are brought into said interlocked position and said first and second cams being substantially in a second engagement position when said wind-up force lock means are in said interlocked position and said webbing has been drawn said predetermined length out of the device, whereby in the first engagement position even if said first member is rotatively driven by said wind-up shaft in a webbing wind-up direction so as to be rotated together with said first cam, the rotation of said first member is prevented by the first and second cams in the first engagement position, and in the second engagement position even if said first member is rotatively driven by said wind-up shaft in a webbing drawing out direction so as to be rotated together with said first cam, the rotation of said first member is prevented by the first and second cams in the second engagement position.

2. A safety belt wind-up device as set forth in claim 1, wherein said device further comprises urging means for positioning said first and second cams in said first engagement position when said wind-up force lock means are in said uninterlocked position.

3. A safety belt wind-up device as set forth in claim 1, wherein said first member is an idle gear and said second member is a gear in mesh with said idle gear and said idle gear is brought into engagement and disengagement with a pinion gear rotatable with said webbing wind-up shaft.

4. A safety belt wind-up device as set forth in claim 3, wherein said means for bringing said lock means into said interlocked and uninterlocked positions comprise a shifter for bringing said idle gear into engagement and disengagement with said pinion gear.

5. A safety belt wind-up device as set forth in claim 4, wherein said means for bringing said lock means into said interlocked and uninterlocked positions include a flexible tube, steel balls closely accommodated in said flexible tube in a row along the longitudinal axis thereof, a rod restoring spring, a rod pressed against said steel balls by said rod restoring spring but moving against a force of said rod restoring spring in response to an engagement of said buckle of said safety belt to bring said shifter into said interlocked position, a shifter restoring spring, said shifter being brought into said interlocked position against a force of said shifter restoring spring and said shifter being retracted by said force of said rod restoring spring upon disengagement of said buckle to return said shifter into said uninterlocked position.

6. A safety belt wind-up device as set forth in claim 1, wherein said means for bringing said lock means into said interlocked and uninterlocked positions is a solenoid assembly.

7. A safety belt wind-up device as set forth in claim 6, wherein said solenoid assembly is received in a cavity of a frame accommodating said wind-up force lock means, and said device further comprises a first cover fixed to an outer surface of one side plate of said frame for covering said wind-up force lock means and a second cover fixed to said one side plate for covering said solenoid assembly in said cavity exposed to an inside of said frame.

8. A safety belt wind-up device as set forth in claim 4 wherein said means for bringing said lock means into said interlocked and uninterlocked positions further comprise a solenoid assembly for bringing said shifter into said interlocked and uninterlocked positions.

* * * * *